J. CHURCHILL.
DIRIGIBLE HEADLIGHT.
APPLICATION FILED MAY 26, 1914.
1,130,478.
Patented Mar. 2, 1915.
2 SHEETS—SHEET 1.
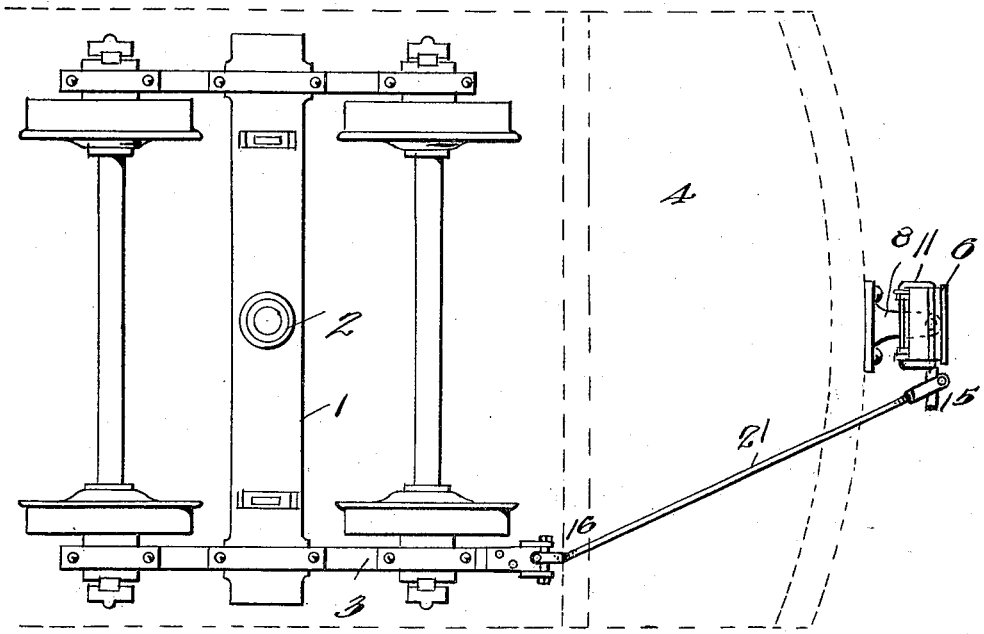
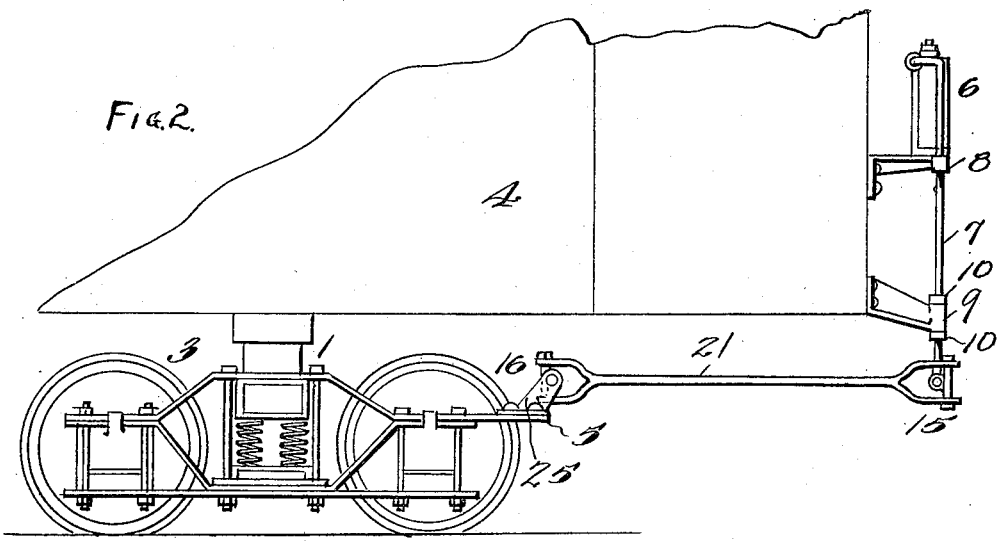
WITNESSES.
INVENTOR
JOHN CHURCHILL
by Herman A. Phillips
Attorney.

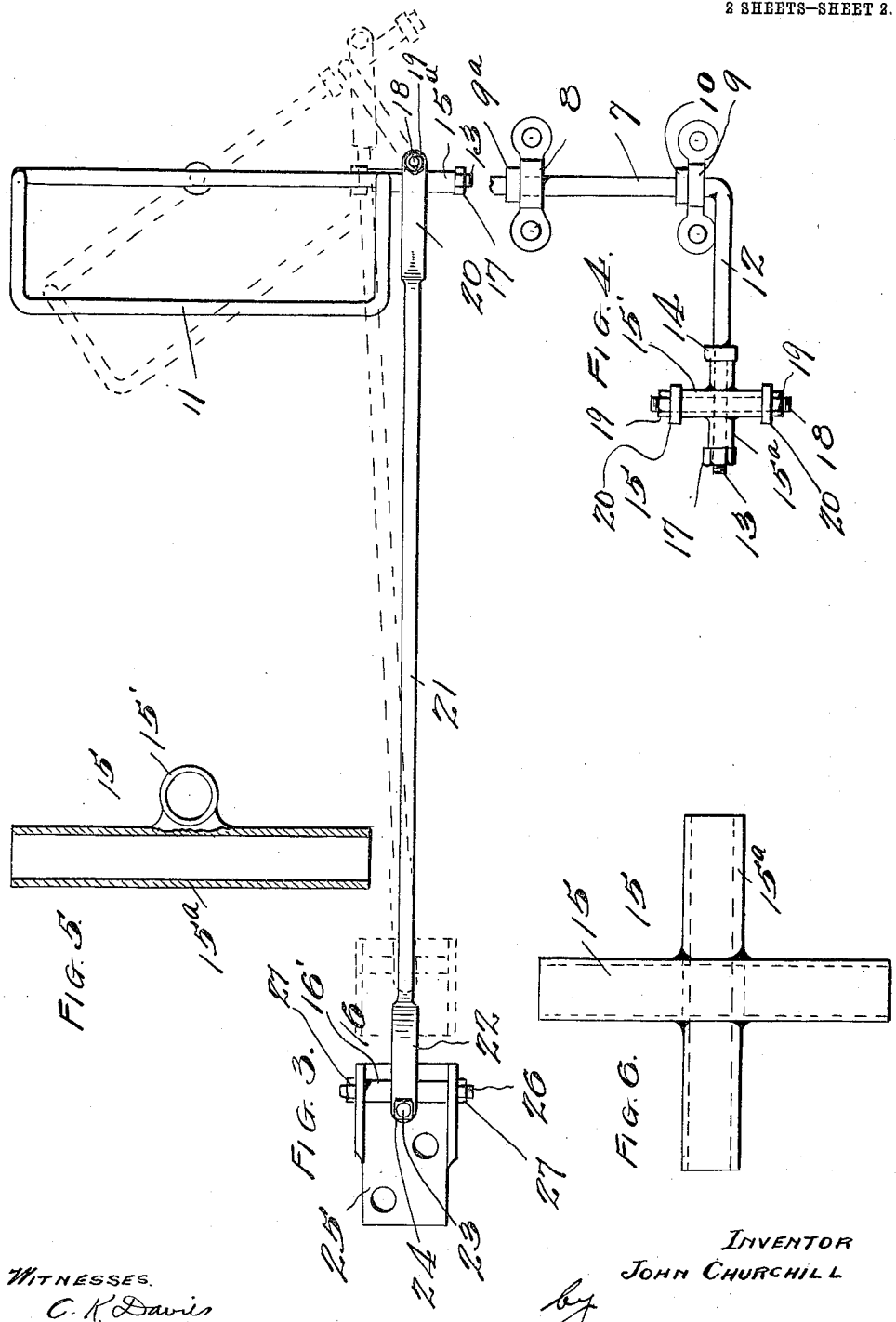

UNITED STATES PATENT OFFICE.

JOHN CHURCHILL, OF MOUNT CARMEL, PENNSYLVANIA.

DIRIGIBLE HEADLIGHT.

1,130,478.  Specification of Letters Patent.  Patented Mar. 2, 1915.

Application filed May 26, 1914. Serial No. 841,135.

*To all whom it may concern:*

Be it known that I, JOHN CHURCHILL, a citizen of the United States of America, residing at Mount Carmel, in the county of Northumberland and State of Pennsylvania, have invented certain new and useful Improvements in Dirigible Headlights, of which the following is a specification.

The present invention relates to dirigible headlights and operating mechanism therefor, and particularly to the means for connecting a pivoted headlight on a street car or other vehicle with a portion of the running gear of said vehicle, so that when the vehicle is passing over a straight portion of track or roadway, the rays from the headlight will be directed along a path in line with the longitudinal center of the vehicle, and consequently directly ahead of the same. When the track or roadway is curved, and the car is passing around the curve, the headlight will be automatically deflected in the direction of the curvature, and thus the lamp is caused to illuminate the curved path over which the vehicle is passing.

The invention consists in the novel combination and arrangement of parts whereby a connection is provided between a revoluble headlight or lamp on a rigid part of the car body, and a truck frame beneath the car, the same being arranged in compact form, and out of the way of other appliances which may be located beneath the car.

In the accompanying drawings I have illustrated a complete example, and slight modification thereof, of the physical embodiment of my invention constructed according to the best mode I have so far devised for the practical application of the principles of the invention.

Figure 1 is a plan view, showing a car body in dotted lines, of a car truck and its connections to a dirigible headlight. Fig. 2 is a side elevation of the showing in Fig. 1. Fig. 3 is an enlarged plan view of the connection between the car truck and dirigible headlight. Fig. 4 is a view as seen from the front showing a slightly modified supporting post for the headlight. Fig. 5 shows a tubular cross head, one of the tubes being in section. Fig. 6 is another view of the tubular cross head both members of which are shown in full.

In the preferred embodiment of my invention I have shown a typical street railway car equipped with the dirigible headlight attachment.

In Figs. 1 and 2 the front portion of a car is indicated, the truck including the bolster 1 and the pivot or fulcrum 2 as usual, and the side frame 3 of the truck which supports the car 4 is provided with an extension 5 to which my actuating device is attached. I have shown the attachment at the right side of the car, but it will be understood that the attachment may be located at any suitable and proper position in order to adapt to the under-framing or under-rigging of the car body.

In equipping the car with my attachment I employ a suitable headlight indicated by the numeral 6, which is supported at the front center of the car upon a post 7, and this post is revolubly supported in a pair of brackets 8 and 9, the brackets being attached to the front of the car or some other rigid portion of the car body. A pair of collars 10—10 are employed in connection with the bracket 9 to support the post 7, and the upper end of the post is formed with an integral rectangular frame 11 upon which the lamp 6 is supported and retained in suitable manner. The bracket 8 at the upper end of the post 7 is located just beneath the rectangular frame 11, and supports the post beneath this frame, so that the post is revolubly supported in these two bearing brackets 8 and 9.

In Fig. 4, the bracket 9 is located at the lower end of the post, and a collar 10 rests upon this bracket 9 and the collar 9ª rests upon the bracket 8 so that the post 7 is revolubly supported between these brackets 8 and 9. This form of post and attaching device illustrated in Fig. 4, merely shows a variation of the means for supporting the post, and it will be understood that numerous other and suitable ways may be devised to suit different conditions existing on different cars.

In all cases the post 7 is provided with a lever arm 12 preferably integral therewith and extended off at right angles to the post. This lever arm 12 is provided with a reduced threaded end 13 and an enlarged shoulder or collar 14, and on this end between the threads and the collar, one of a pair of tubular cross heads as 15 is supported. The cross head 16 which is attached to the truck frame is identical with the cross head 15 which is connected to this lever arm 12. The cross head 15 is fashioned with a vertically disposed tube 15′ and a horizontally disposed tube or tubular member 15ª, while the cross head 16 has a horizontal tube 16′ and a vertically arranged tube 16ª.

The cross head 15 is attached to the lever arm 12 by means of its tubular member 15ª, and a nut 17 holds the tube 15ª on the nut 13 against the collar 14. The tubular member 15′ is adapted to receive a bolt 18 which is threaded at top and bottom and passed through said tubular member 15′, and by means of the nuts 19—19, the bifurcated end or fork 20 of a draw bar 21 is secured to this cross head. The rear bifurcated end 22 of the draw bar 21 is attached by means of the bolt 23 to the tube 16ª, and the nuts 24 clamp these parts together. The horizontal tube 16′ is attached to a bracket 25 which is rigidly fixed to the truck frame 5 by means of a bolt 26 and nuts 27.

All parts of the appliance are made of suitable metal and properly fashioned to perform their different functions, and the two cross heads are made up of crossed tubular members either wrought or cast metal, and these two cross heads form very effective universal joints at the ends of the draw bar 21.

In Fig. 3 the action of the attachment is illustrated, the changed position being indicated in dotted lines. As the car rounds a curve, the trucks follow the curvature of the track, while the body of the car rounds the curve on a tangential line. The effect of these two different movements is to cause the post 7 to be revolved through the movement of the draw bar 21, and the movement of the headlight is determined by the relative movement between the rigid car body, and the flexible car truck, as will be readily understood.

Numerous changes may be made within the scope of my claim without departing from the spirit thereof, and it will be understood that this appliance may be attached to cars in present use as well as be used to equip new cars as they are put out of the factory. The leverage of the arm 12 may also be altered, either increased or decreased, to suit conditions as will readily be understood. The essential features of my invention reside in the compact and effective arrangement of the universal joints formed by the tubular cross heads, and these tubular cross heads allow for a free and flexible movement of the draw bar and consequently provide for a facile response on the part of the headlight whenever a variation or curvature is encountered in the railway track.

Having thus fully described my invention, what I claim as new and desire to secure by Letters Patent, is:—

The combination in a dirigible headlight with a car body a lamp post revolubly supported thereon, and a truck frame, of a lever arm on the lamp post, an integral cross tubular member loosely attached to said lever arm, a draw bar loosely attached to one of said crossed tubular members, a similarly crossed tubular member journaled on the car truck, and said draw bar loosely connected to the second element of said crossed tubular member.

In testimony whereof I affix my signature in presence of two witnesses.

JOHN CHURCHILL.

Witnesses:
H. O. MOSER,
EMMA HINDMARCH.

Copies of this patent may be obtained for five cents each, by addressing the "Commissioner of Patents, Washington, D. C."